United States Patent [19]
Kubota et al.

[11] 3,870,733
[45] Mar. 11, 1975

[54] MIXTURES OF GLYCERIDES HAVING CYTO-C22 FATTY ACID CONTENT

[75] Inventors: Hayato Kubota, Kobe; Sadao Nakayama, Hirakata; Teizaburo Tateishi, Toyonaka, all of Japan

[73] Assignee: Fuji Oil Company, Ltd., Osaka, Japan

[22] Filed: Feb. 7, 1972

[21] Appl. No.: 224,153

Related U.S. Application Data

[63] Continuation-in-part of Ser. No. 4,111, Jan. 20, 1970, abandoned, and a continuation-in-part of Ser. No. 5,906, Jan. 26, 1970, abandoned, and a continuation-in-part of Ser. No. 53,146, July 2, 1970, abandoned.

[52] U.S. Cl.............. 260/410.8, 426/65, 426/175, 426/194, 426/202
[51] Int. Cl........ C11c 3/10, A23d 3/00, A23d 3/02
[58] Field of Search.... 260/410.8; 99/118 R, 122 R; 426/194, 362, 477

[56] References Cited
OTHER PUBLICATIONS
Täufel et al., Chemical Abstracts, Vol. 52, 17757i (1958).

Primary Examiner—Donald G. Daus
Assistant Examiner—Diana G. Rivers
Attorney, Agent, or Firm—Craig & Antonelli

[57] ABSTRACT

Novel oil and fat compositions and a process for preparing the same.

The oil and fat compositions are similar in fatty acid composition to milk fats but are different in glyceride composition therefrom, i.e., the compositions contain $C_{22}$, $C_{24}$ and $C_{26}$ glycerides in amounts of 0.2 to 3.8 percent, 0.2 to 15 percent and 0.4 to 25 percent by weight, respectively. The compositions are less in cholesterol content, scarcely varied in hardness due to temperature variation, and quite stable to oxidation. They are prepared by the interesterification of animal or vegetable oils or fats with esters of butyric and/or caproic acids and, if desired, with esters of caprylic, capric and lauric acids.

3 Claims, 9 Drawing Figures

MIXTURES OF GLYCERIDES HAVING CYTO-C22 FATTY ACID CONTENT

This application is a continuation-in-part of our prior U.S. Applications Ser. Nos. 4,111, 5,906 and 52,146, filed Jan. 20, 1970, Jan. 26, 1970 and July 2, 1970, respectively, and each now abandoned.

Field of the Invention

This invention relates to novel synthetic oil and fat compositions and to a process for preparing the same. More particularly, the invention pertains to novel oil and fat compositions which are similar in fatty acid composition to milk fats but are different in glyceride composition therefrom; extremely lower in cholesterol content than milk fats; relatively soft at low temperatures and relatively hard at high temperatures; favorable for use in the confectionery field; and more excellent in oxidation stability than natural animal or vegetable oils and fats. The invention further pertains to a process for preparing novel synthetic oil and fat compositions which comprises subjecting to interesterification natural animal or vegetable oil or fat and esters of butyric and/or caproic acids with monohydric lower alcohols ($C_1$ to $C_4$) or diesters of said acids with dihydric lower alcohols ($C_2$ to $C_4$) and/or triglycerides of said acids and, if desired, the same esters as above of $C_8$, $C_{10}$ and/or $C_{12}$ fatty acids, and then purifying the resulting oil or fat.

DESCRIPTION OF THE PRIOR ARTS

As one of the oils and fats which have habitually been used by men among natural animal and vegetable oils and fats, there is a milk fat. When applied to foods, the milk fat displays various excellent physical properties which are not seen in other oils and fats. For example, when the milk fat is used as a confectionery material, it exhibits an excellent creaming property and provides a unique desirable flavor. Generally, however, such milk fats are expensive due to their being restricted in starting materials. Accordingly, various attempts have heretofore been made as to whether the physical functions and unique flavors of milk fats can be secured by use of other inexpensive materials. Margarine is a typical fat food which has reproduced the physical properties and flavor of natural butter from other materials than those used for the preparation of milk fats. Conventionally, margarine was prepared according to a process carried out by blending various animal or vegetable oils and fats other than milk fats to make the resulting blend similar in such physical properties as melting point, plasticity, taste and the like to milk fats, incorporating water into the blend by use of an emulsifier and further incorporating a flavor therein to impart a buttery flavor to the blend. This process has successively been improved in order to produce margarine of better quality. For example, U.S. Pat. No. 2,892,721 teaches a method for producing synthetic butter fats quite similar to milk fats by subjecting such a natural animal fat as beef tallow or the like and a coconut oil to interesterification. It is true that such synthetic butter fats as produced according to the method taught in said United States patent are satisfactory in physical properties. However, when the butter fats are desired to be stored in the form of margarine for a long period of time, or desired to be modified with enzyme to impart the flavors of milk products thereto, a soapy flavor is undesirably generated to make it impossible to use them for foods. Further, U.S. Pat. No. 3,477,857 discloses a process for preparing foods having a markedly excellent flavor by treating milk fats with a lipase enzyme. It is sure that the process disclosed in said U.S. Pat. No. give products having a buttery flavor high in heat resistance. The said flavor, however, is a fermented buttery flavor and is not a sweet buttery flavor which has widely been utilized as a buttery flavor, in general. Thus, it has been left as a subject to provide a sweet butter flavor by use of an enzyme system.

BACKGROUND OF THE INVENTION

In the market, there is desired the advent of oils and fats which have been improved in various respects, i.e., inexpensive oils and fats capable of realizing the dream that has not been realized hitherto and capable of satisfying the desires of consumers.

When stored in a refrigerator, natural butter is solidified to become difficultly spreadable on bread and the like. On the other hand, when allowed to stand in a room in summer time, a part of the butter is liquefied. Thus, the appearance of butter products less in such undesirable phenomena has long been desired. As to butter products, the problem of sterols, particularly cholesterol (the same shall apply hereinafter) has particularly been close up. In case there are used milk fats which have not been refined because of their being markedly excellent in flavor, the problem of cholesterol is necessarily accompanied. The advent of oils and fats of the milk fat type which not only maintain the unique physical properties and flavor of milk fats but also are less in cholesterol content is a great demand of the market.

Further, natural animal and vegetable oils and fats always encounter with the problem of oxidation resistance. Even when purified, the oils and fats are oxidized with lapse of time and are deteriorated both in nutrition and in flavor.

With an aim to enhance the oils and fats in oxidation resistance, there have heretofore been adopted such procedures that they are incorporated with antioxidants or are hydrogenated to remove poly-unsaturated fatty acids susceptible to oxidation. Oils and fats, which are difficultly susceptible to oxidation, have been quite attractive.

Heretofore, there have been no oils and fats for topping which are more excellent than milk fats in such properties as foamability, emulsifiability, storability and the like. In the case of topping, the said properties of oils and fats are intended to be improved chiefly from the side of emulsifiers and not from the side of oils and fats.

Margarine and shortening products have been used as confectionery materials. These products are evaluated according to their working qualities such as shortening value, creaming value, emulsification value, water absorptivity, icing property, etc. Among these, the creaming value is particularly important, and has a great significance in evaluating the qualities of oils and fats when these are applied to butter creams, butter cakes, cream puffs and pies. In order to obtain oils and fats excellent in creaming property, the incorporation of various emulsifiers has been attempted hitherto. Further, it has been a great dream whether such property can be imparted to glycerides themselves.

The present inventors have found that such dreams and market demands as mentioned above can be realized and satisfied by introducing according to interesterification butyric and/or caproic acids into the glycerides of natural animal and vegetable oils and fats.

SUMMARY OF THE INVENTION

An object of the present invention is to provide a novel oil or fat composition which can be stored over a long period of time and which hardly be solidified or softened due to temperature variation.

Another object of the invention is to provide a novel oil or fat composition suitable for imparting a sweet buttery flavor to a food by use of an enzyme.

A further object of the invention is to provide a novel oil or fat composition less in cholesterol content.

A still further object of the invention is to provide a novel oil or fat composition excellent in the aforesaid working qualities as an oil or fat for topping.

A still further object of the invention is to provide a process for preparing an oil or fat composition having such properties as mentioned above.

A still further object of the invention is to provide a process for enhancing animal fats and vegerable oils in oxidation resistance.

The oil or fat composition of the present invention is prepared by subjecting to interesterification natural animal or vegetable oil or fat and esters of butyric and/or caproic acids and, if desired, esters of caprylic, capric and/or lauric acids, and then decolorizing and deodorizing the reaction product.

I. Interesterification

A. Starting animal or vegetable oil or fat material

The natural animal or vegetable oil or fat referred to herein is animal oil or fat or a vegetable oil. Examples of the animal oil or fat include beef tallow, lard, hardened fish oil and hardened whale oil, and examples of vegetable oil include palm oil, coconut oil, palmkernel oil, soybean oil, rapeseed oil and cottonseed oil.

In order to control such physical properties as melting point and the like, the oil or fat is sometimes subjected to hydrogenation or fractionation. Among the animal oils and fats, beef tallow and lard are particularly preferable.

B. Esters of butyric, caproic, caprylic, capric and/or lauric acids

These esters are monoesters of said fatty acids with straight chain lower monoalcohols having one to four carbon atoms; diesters of said acids with straight chain lower diols having two to four carbon atoms; and triglycerides of said acids. Concrete examples of these esters include ethyl ester of butyric acid, butyl ester of butyric acid, diester of butyric acid with ethylene glycol, triglyceride of butyric acid, triglyceride of caproic acid, triglyceride of caprylic acid, triglyceride of capric acid, triglyceride of lauric acid and the like.

The purity of each of the esters of said lower fatty acids is not so significant. For example, commercially available ester of butyric acid frequently contains esters of caproic and/or caprylic acids. Accordingly, these marketing esters have to be analysed before they are subjected to the following interesterification.

C. Interesterification

This reaction may be carried out according to any of the known modes, and the reaction conditions are not critical. Prior to the interesterification, however, the oil or fat has preferably been subjected to purification (deacidification, decolorization and deodorization). This is because the oil or fat can be prevented from deterioration in color tone due to the catalyst used or the heat after the interesterification.

An embodiment of the above reaction is mentioned below.

Previously refined starting materials are weighed and mixed together, and the resulting mixture is introduced into a reaction vessel. Subsequently, the reaction vessel is tighly closed, and heating is initiated at the same time when the pressure reduction means used is put in motion. Sufficient dehydration should be effected by heating the mixture to 120°C so far as the system is maintained under a reduced pressure of about 20 mmHg. Thereafter, the mixture is cooled to 50° to 100°C, preferably to 80°C, and then a catalyst is added. The amount of the catalyst is ordinarily 0.1 to 1 percent by weight based on the weight of the starting oil or fat. As the catalyst, there is used sodium methylate, sodium ethylate, sodium hydroxide, stannous hydroxide or the like. Ordinarily, the reaction is complete when the system is continuously stirred for 30 to 60 minutes. After completion of the reaction, the catalyst is removed. On laboratory scale, the catalyst removal is effected by adding water to the system in an amount of 1 percent by weight based on the weight of the starting oil or fat, stirring the system, uniformly dispersing in the system 1 percent by weight of diatomaceous earth, and then subjecting the system to filtration by use of a filter. On commercial scale, a water-washing step would be adopted. That is, the reaction mixture after completion of the reaction is transferred from the reaction vessel to a water-washing tank equipped at the upper portion with a shower. From this shower, hot water kept at about 70° to 90°C is sprayed to the mixture in the tank. Ordinarily, the hot water is sprayed several times, in an amount each of about 20 percent by weight based on the weight of the reaction mixture and, after setting of the system, the aqueous layer is removed through the bottom of the tank.

II. Purification

The thus treated reaction mixture obtained as in the above is then transferred to a decolorization vessel and dehydrated at an elevated temperature under reduced pressure. As the decolorization vessel, there is used a vessel similar in function to the reaction vessel. After completion of the dehydration, about 1 to 5 percent by weight based on the weight of the reaction mixture of a mixed decolorizing agent composed of active carbon and active clay is added, and the mixture is decolorized for about 10 to 20 minutes with stirring at about 110°C and completely freed from the formed soap. After removing the decolorizing agent, the reaction mixture is transferred into the subsequent deodorization step. The deodorization is effected by steam distillation under reduced pressure at an elevated temperature. Ordinarily, steam is blown into the system at a temperature of 180° to 280°C under a reduced pressure of 5 mmHg or less to remove volatile materials.

III. Product

The presence of butyric and/or caproic acids in the purified oil or fat is essential. Caprylic, capric and lauric acids are useful for increasing particularly the flavor of the product at the time of its final use. The synthetic oil or fat is so adjusted as to contain 1 to 25 percent by weight of butyric and/or caproic acids and preferably contain, in addition thereto, 0.5 to 10 percent by weight of caprylic acid, 0.5 to 10 percent by weight of capric acid and 0.5 to 10 percent by weight of lauric acid. Butyric and caproic acids display their functions even when used alone, but are preferably used in combination. If the amount of butyric and/or caproic acids is less than 1 percent by weight, no effects of the present invention can be expected, while if said amount is more than 25 percent by weight, the synthetic oil or fat is undesirably made bitter. Caprylic, capric and lauric acids are used in amounts within the range from 0.5 to 10 percent by weight, respectively.

In case an oil or fat is desired to be modified with an enzyme system by use of such synthetic oil or fat as mentioned above, the amount of lauric acid in the synthetic oil or fat should particularly be taken into consideration. If the content of lauric acid exceeds 10 percent, a soapy flavor is generated. In the case of a margarine or the like product, however, there are some cases where the synthetic oil or fat having a lauric acid content of more than 10 percent is adopted. Thus, the content of lauric acid cannot be regulated definitely. In case the amount of lauric acid in the synthetic oil or fat is particularly desired to be increased, the lauric acid moiety is not always required to be obtained only by interesterification. That is, the lauric acid content can be controlled as well by blending the synthetic oil or fat with coconut oil, palmkernel oil or the like.

According to gas chromatographical analysis (FIGS. 1–7), however, the synthetic oils and fats of the present invention where triglycerides, for example, are used for interesterification are entirely different from natural milk fat, so far as glyceride composition is concerned.

In the accompanying drawings.

The following table shows the percentages, in terms of carbon numbers, of the above-mentioned glyceride moieties.

| carbon \ FIG. | 1 | 2 | 3 | 4 | 5 | 6 | 7 |
|---|---|---|---|---|---|---|---|
| 56 | 0.2 | | | | | | |
| 54 | 4.0 | 22.1 | 11.4 | 17.8 | 8.4 | 21.6 | 11.2 |
| 52 | 9.9 | 33.4 | 15.4 | 30.1 | 13.4 | 33.1 | 14.3 |
| 50 | 10.8 | 17.4 | 11.9 | 17.8 | 13.6 | 17.6 | 13.4 |
| 48 | 8.0 | 7.5 | 10.2 | 13.1 | 9.4 | 7.2 | 9.4 |
| 46 | 6.4 | 2.8 | 6.9 | 2.5 | 6.3 | 2.2 | 6.9 |
| 44 | 5.7 | 1.6 | 4.5 | 1.3 | 4.8 | 1.4 | 5.2 |
| 42 | 6.3 | 1.4 | 3.5 | 5.0 | 4.8 | 5.6 | 4.5 |
| 40 | 10.3 | 2.4 | 9.9 | 1.1 | 9.2 | 1.3 | 8.7 |
| 38 | 13.9 | 3.5 | 10.2 | 1.9 | 10.5 | 2.2 | 8.5 |
| 36 | 12.3 | 3.1 | 5.3 | 2.2 | 6.7 | 2.3 | 6.0 |
| 34 | 6.4 | 2.4 | 4.0 | 1.1 | 3.5 | 1.4 | 3.5 |
| 32 | 2.9 | 2.0 | 2.0 | 0.8 | 2.1 | 0.9 | 2.1 |
| 30 | 1.4 | 0.4 | 1.1 | 3.1 | 1.4 | 2.4 | 1.3 |
| 28 | 0.8 | | 0.6 | 0.4 | 1.4 | trace | 1.1 |
| 26 | 0.3 | | 1.7 | 0.4 | 2.2 | 0.1 | 1.8 |
| 25 | 0.4 | | | | | | |
| 24 | trace | | 1.1 | 0.9 | 1.6 | 0.5 | 1.3 |
| 22 | 0.1 | | 0.3 | 0.5 | 0.5 | 0.1 | 0.8 |
| 20 | | | trace | | | | |

So far as the fatty acid composition is concerned, the oils and fats of the present invention do not substantially differ from natural milk fats. For example, the fatty acid composition of the synthetic oil or fat of the present invention is:

$C_4$ } 1 –25% by weight
$C_6$
$C_8$     0.5–10% do.
$C_{10}$   0.5–10% do.
$C_{12}$   0.5–10% do.

while that of natural milk fat (of the Hokkaido area) is:

$C_4$    2.7–3.7% by weight
$C_6$    2.1–2.8% do.
$C_8$    1.0–1.5% do.
$C_{10}$   2.5–3.6% do.
$C_{12}$   2.5–4.1% do.

Figure 1:
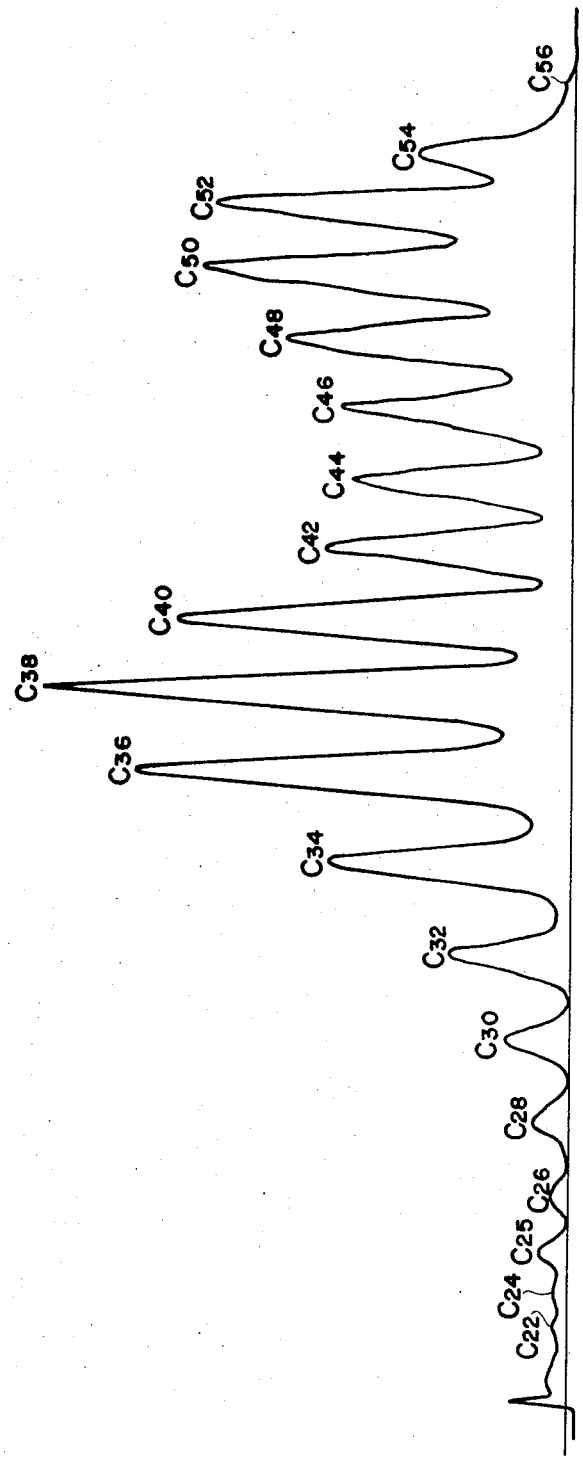
FIG. 1 is a graph showing the glyceride moiety of the milk fat.
Figure 2:
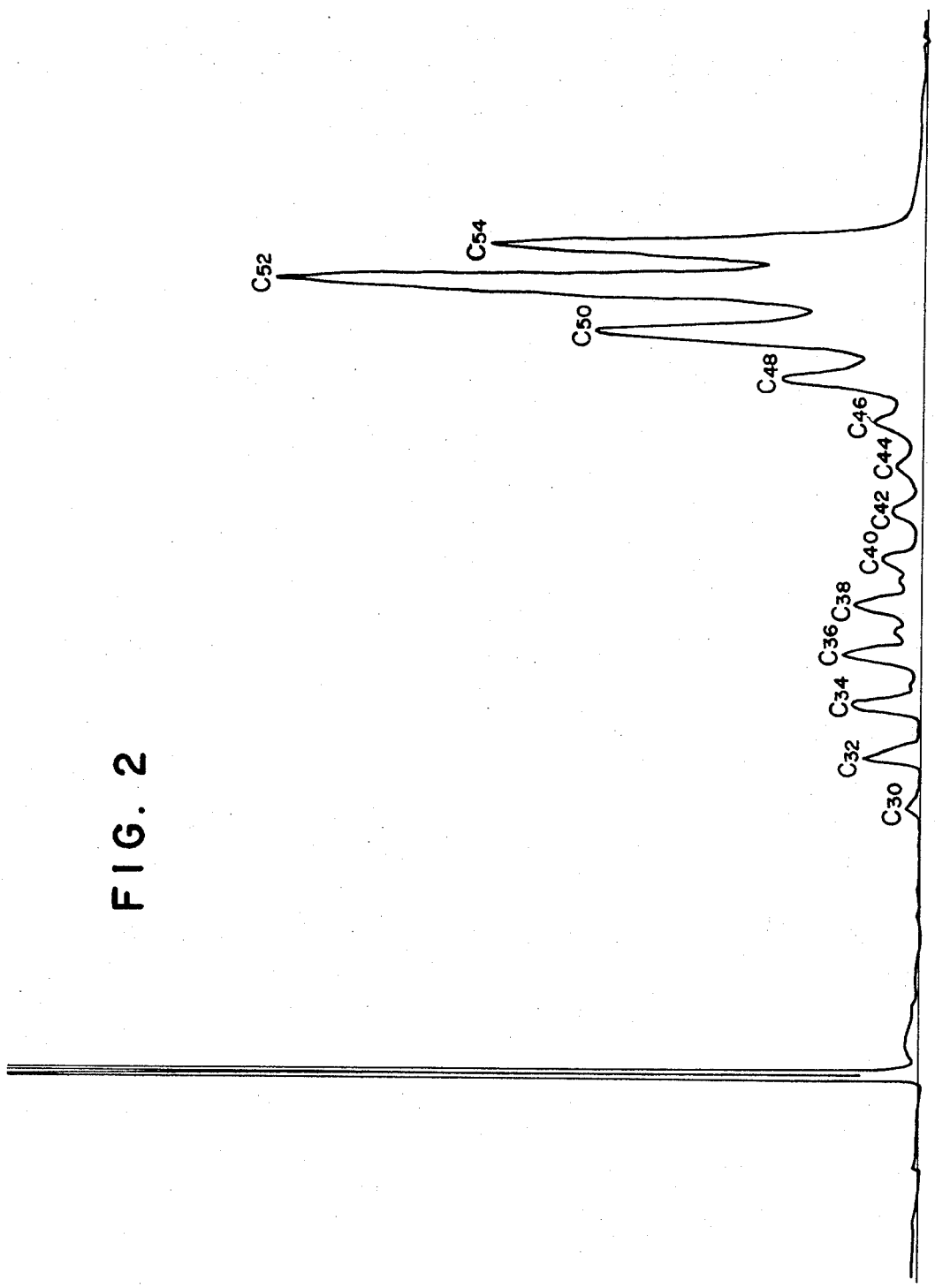
FIG. 2 is a graph showing that of the same blend of Example 2 hereinafter mentioned but without interesterification.
Figure 3:
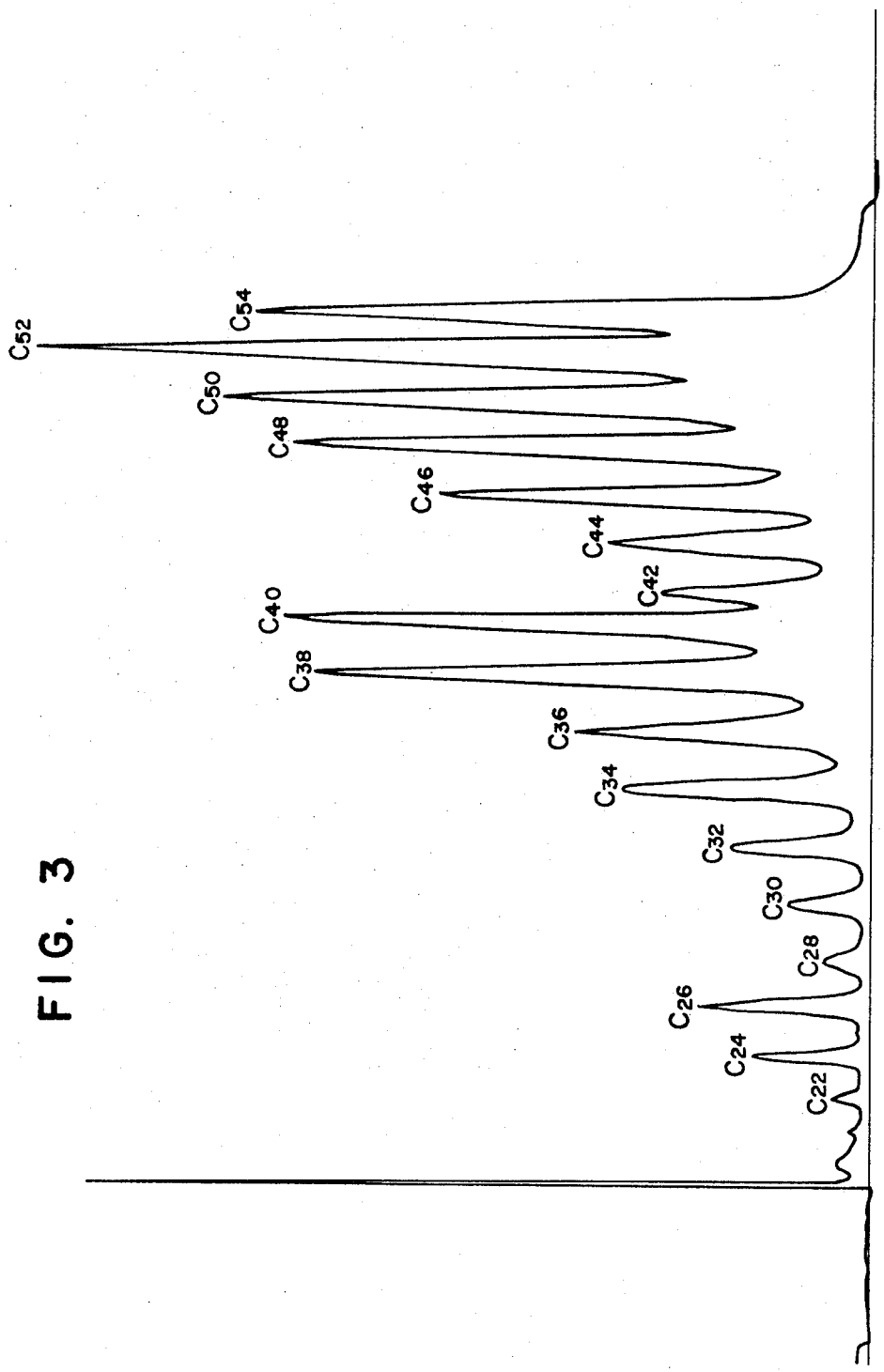
FIG. 3 is a graph showing that of the blend of Example 2.
Figure 4:
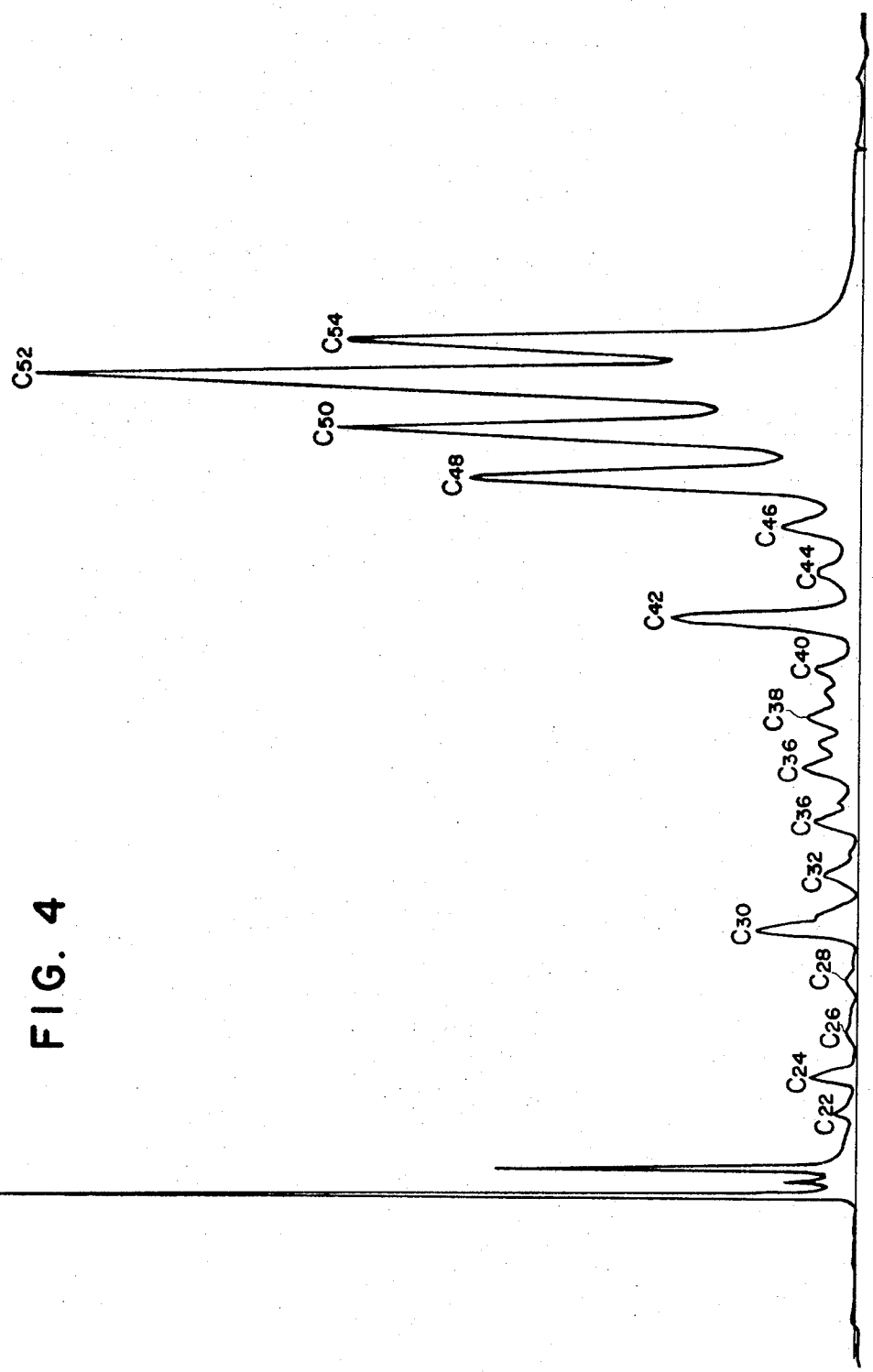
FIG. 4 is a graph showing that of the same blend of Example 13 but without interesterification.
Figure 5:
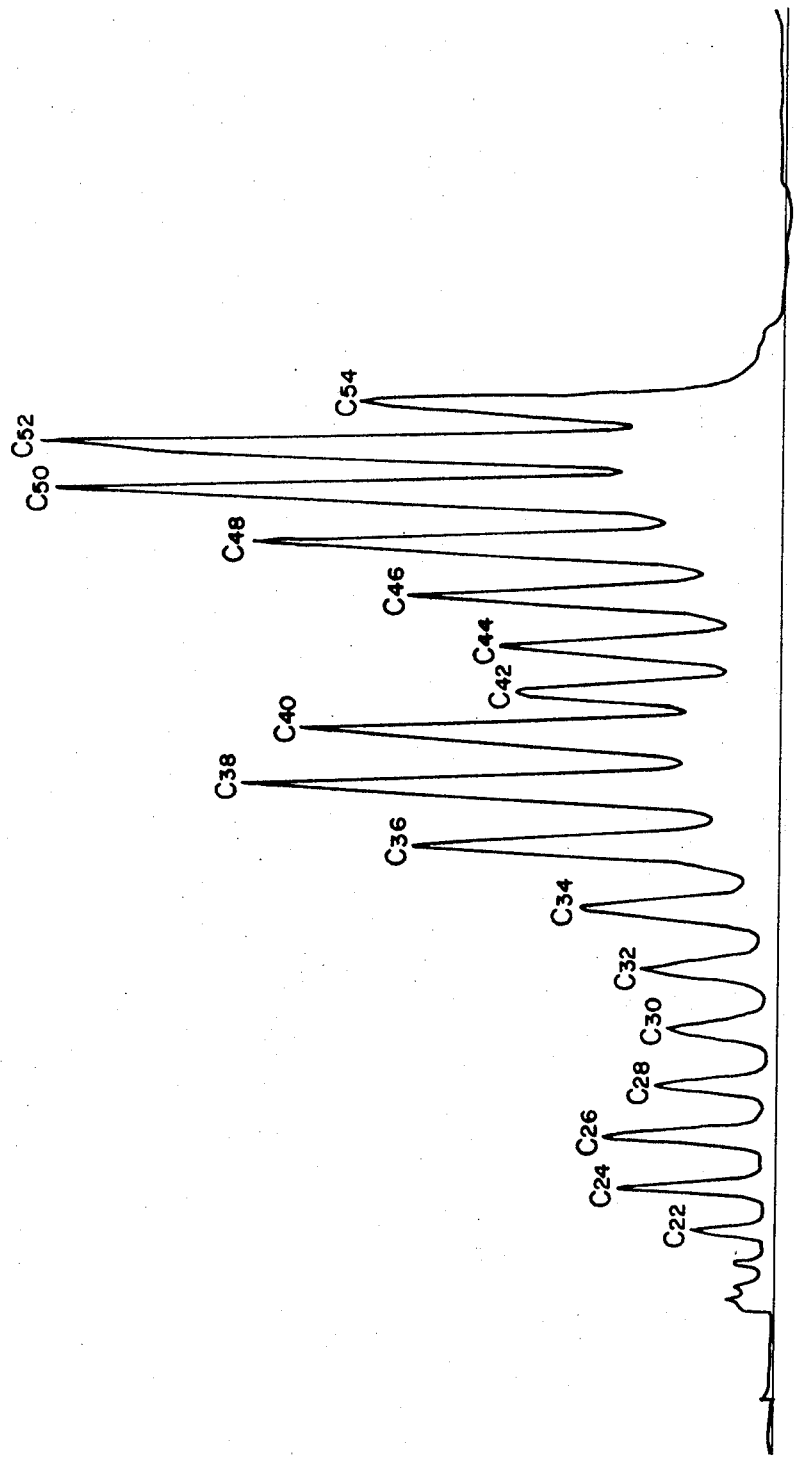
FIG. 5 is a graph showing that of the blend of Example 13.
Figure 6:
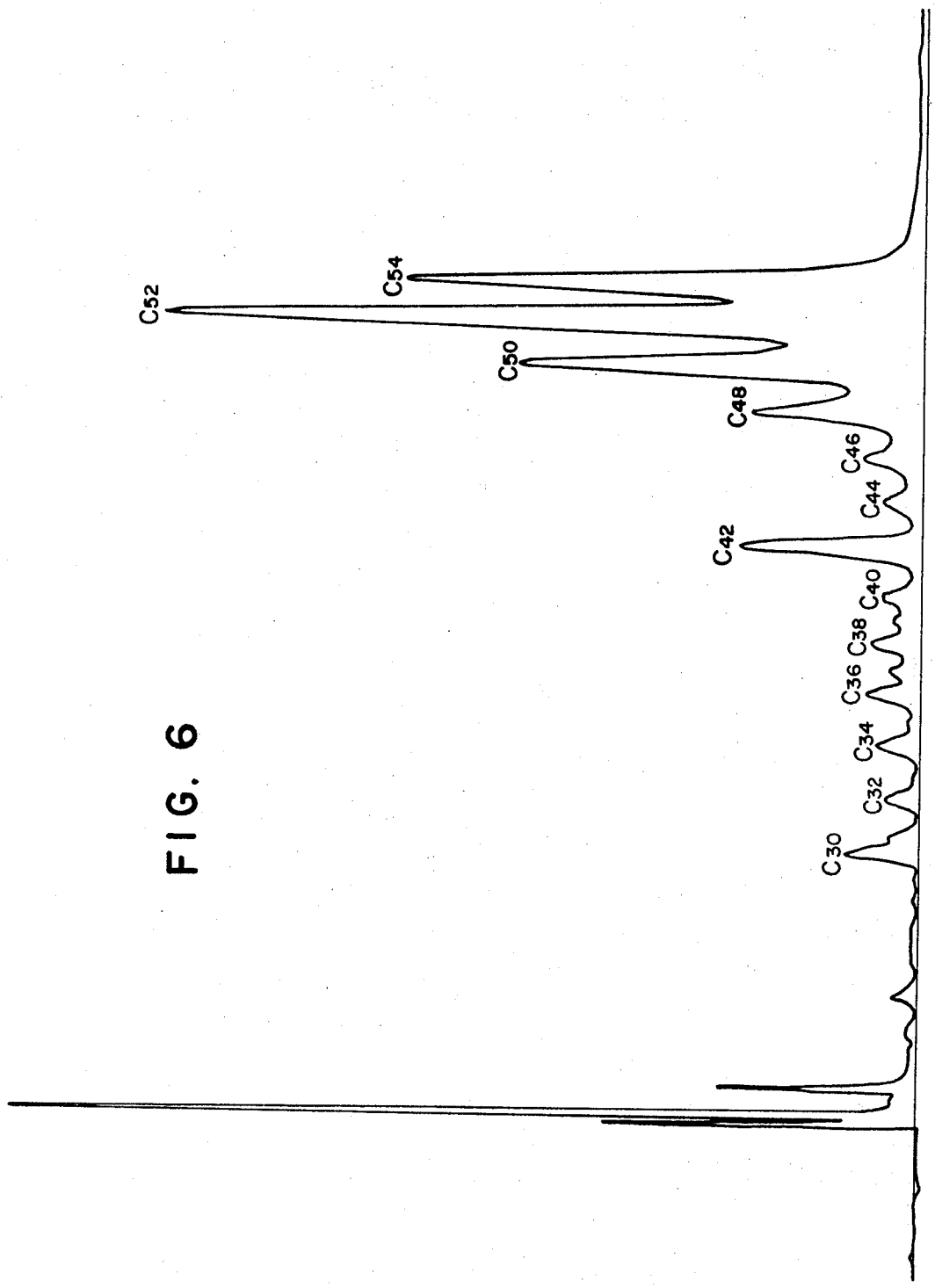
FIG. 6 is a graph showing that of the same blend of Example 14 without interesterification.
Figure 7:
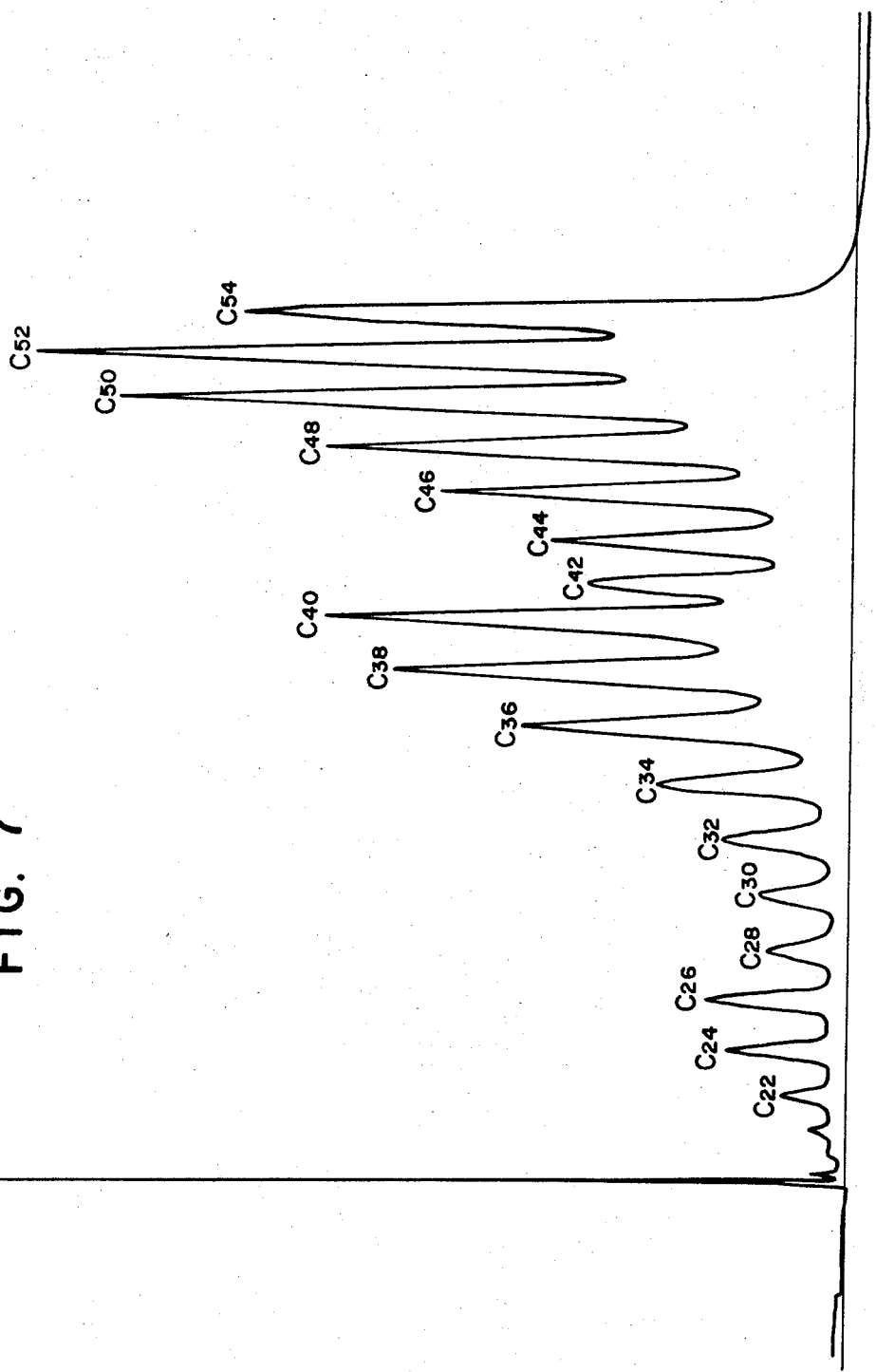
FIG. 7 is a graph showing that of the blend of Example 14.
Figure 8:
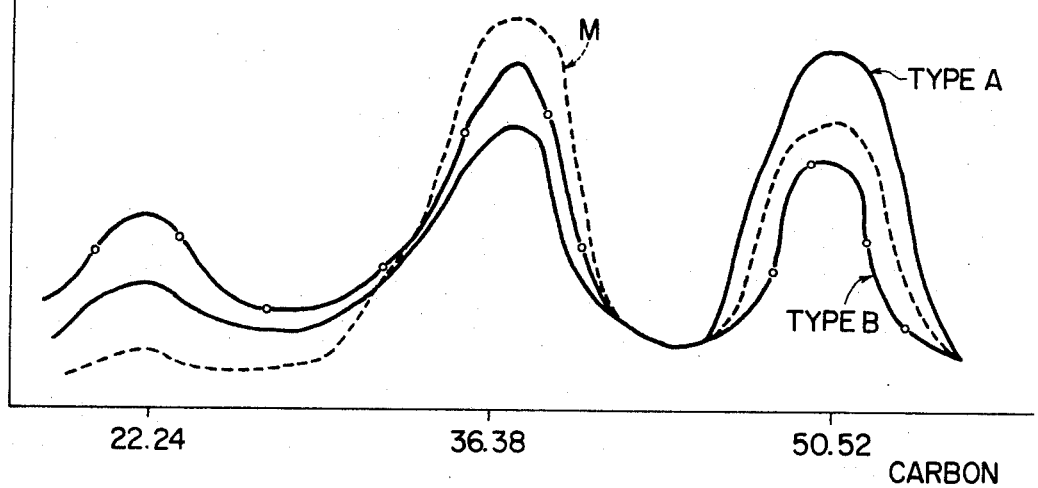

FIG. 8 is a graph showing, on the basis of the results of analysis in triglyceride composition of the blends of Examples 1 to 27, a comparison between natural milk fats and the synthetic oils and fats of the present invention in carbon number and in content of triglyceride composition. As is clear from the graph of FIG. 8, it is understood that the synthetic oils and fats of the present invention are extremely higher in content of lower glycerides ($C_{22}$–$C_{26}$) than the natural milk fats.

In case the oils and fats are synthesized according to the blending of commercial scale production, the balance of higher triglycerides is $C_{50+52} > C_{36+38}$. However, when the synthesis is effected by using $C_4$ and $C_6$ fatty acids in extremely large amounts within the range of the present invention, it is possible to bring said balance to $C_{50+52} < C_{36+38}$. Thus, the synthetic oils and fats of the present invention may roughly be classified into two types of A and B.

A comparison in carbon number of glyceride moiety between the synthetic oils and fats of the present invention and the natural milk fats, which comparison has been made on the basis of the experimental results of Examples 1 to 27, is as follows:

| | Present oils and fats | | Milk fats |
|---|---|---|---|
| | Type A (wt%) | Type B (wt%) | (wt%) |
| $C_{22}$ | 0.2 – 1.2% | 1.2 – 3.8% | Up to 0.2% |
| $C_{24}$ | 0.2 – 2.5% | 2.5 – 15% | do. 0.2% |
| $C_{26}$ | 0.4 – 4.0% | 3.5 – 25% | do. 0.4% |
| $C_{36}$ $C_{38}$ $C_{50}$ $C_{52}$ | $C_{36+38} < C_{50+52}$ | $C_{36+38} > C_{50+52}$ | $C_{36+38} > C_{50+52}$ |

Balance of glyceride composition

| Example | $C_{52+50}$ (wt%) | | $C_{38+36}$ (wt%) | Type |
|---|---|---|---|---|
| 1 | 39.9 | > | 24.0 | A |
| 2 | 27.3 | > | 15.5 | A |
| 3 | 36.5 | > | 20.3 | A |
| 4 | 28.3 | > | 21.3 | A |
| 5 | 21.9 | ≧ | 21.7 | A |
| 6 | 18.9 | < | 21.0 | B |
| 7 | 7.5 | < | 22.5 | B |
| 8 | 41.2 | > | 3.2 | Control |
| 9 | 32.5 | > | 7.0 | do. |
| 10 | 28.4 | > | 11.1 | A |
| 13 | 27.0 | > | 17.3 | A |
| 14 | 27.7 | > | 14.5 | A |
| 18 | 11.6 | < | 22.8 | B |
| 21 | 3.7 | < | 16.4 | Control |
| Milk fat | 20.7 | < | 26.2 | do. |

It is one of the characteristics of the glyceride composition of the present oils and fats that the total amount of $C_{38}$ and $C_{36}$ is less than 25 percent by weight.

The synthetic oils and fats of the present invention are characterized in that they have such specific properties as mentioned below.
1. Far lower in cholesterol content than milk fats.
2. More excellent in oxidation stability than natural animal and vegetable oils and fats.
3. More practically suitable in melting property than milk fats.
4. Markedly excellent in creaming property.
5. Novel as substrates for enzyme systems to be used in the production of sweet butter flavors excellent in heat resistance.
6. Usable for such specific uses as margarines, synthetic toppings, coffee whiteners, filled milk, etc.

The above-mentioned specific properties are explained in further detail below.
1. The synthetic oils and fats of the present invention are far lower in cholesterol content than natural butter:

The synthetic oils and fats of the present invention have such merits that they are not only similar in physical properties to natural butter but also far lower in cholesterol content.

It is considered that the reason why the present oils and fats are lower in cholesterol content reside in that the starting esters scarcely contain sterols, that the starting oils and fats have been purified prior to interesterification, and that the resulting oils and fats are further purified.

The present inventors measured the sterol contents of natural butter and the present synthetic oils and fats to find that the sterol content of the latter was about one-third to one-eighth of that of the natural butter. The results of the above-mentioned measurements were set forth in Tables 1 and 2, provided that Table 1 is concerned with seasonal variations in sterol content of butter obtained in the Hokkaido area in 1965.

Table 1

Results of analysis of sterols in milk fat produced in the Hokkaido area in 1965:

| Month | Sterol content (%) | Kind of sterols (composition ratio; %) | | | | | Iodine value (I.V.) | Saponification value (S.V.) |
|---|---|---|---|---|---|---|---|---|
| | | Cholestane | Cholesterol | ampesterol | Stigma sterol | β-Sito sterol | | |
| 4 | 0.24 | 0.4 | 99.1 | 0.4 | — | 0.1 | 30.3 | 228.8 |
| 5 | 0.24 | 0.5 | 99.3 | 0.3 | — | — | 32.1 | 228.4 |
| 6 | 0.25 | 0.6 | 99.2 | 0.2 | — | — | 35.6 | 230.6 |
| 7 | 0.26 | 1.4 | 98.2 | 0.4 | — | — | 37.5 | 227.5 |
| 8 | 0.25 | 1.3 | 98.6 | 0.1 | — | trace | 37.3 | 227.6 |
| 9 | 0.30 | 1.3 | 98.1 | 0.2 | — | trace | 34.1 | 229.1 |
| 10 | 0.30 | 1.4 | 98.4 | 0.2 | — | — | 34.2 | 230.1 |
| 11 | 0.29 | 0.7 | 99.2 | 0.1 | — | — | 33.2 | 231.3 |
| 12 | 0.26 | 0.2 | 99.6 | 0.2 | — | — | 30.3 | 231.5 |
| 1 | 0.28 | 0.3 | 99.3 | 0.4 | — | — | 30.3 | 228.7 |
| 2 | 0.24 | 0.2 | 99.6 | 0.2 | — | — | 31.4 | 228.2 |
| 3 | 0.25 | 0.6 | 99.1 | 0.3 | — | — | 30.3 | 230.8 |
| Average | 0.26 | 0.7 | 99.0 | 0.3 | — | — | 33.3 | 229.4 |

Table 2

Results of analysis of sterols in the present synthetic oils and fats:

| Sample* | Sterol content (%) | Kind of sterols (composition ratio: %) | | | | |
|---|---|---|---|---|---|---|
| | | Cholestane (%) | Cholesterol (%) | ampesterol (%) | Stigmasterol (%) | β-Sitosterol (%) |
| Example | | | | | | |
| 1 | 0.08 | 0.3 | 98.4 | 0.4 | — | 0.9 |
| 2 | 0.05 | 0.4 | 89.7 | 1.1 | — | 8.8 |
| 12 | 0.08 | 0.5 | 89.5 | 1.0 | trace | 9.0 |
| 13 | 0.06 | 0.2 | 96.9 | 0.6 | — | 2.3 |
| 14 | 0.04 | 0.6 | 96.3 | trace | — | 3.1 |

*Refer to Table 6.

2. The synthetic oils and fats of the present invention are excellent in oxidation stability:

The synthetic oils and fats of the present invention were tested in oxidation stability according to the active oxygen method (AOM) described in Am. Oil Chemists' Society, Tentative Method, 12–57. As the result, the present synthetic oils and fats, which had been incorporated with $C_4$ and/or $C_6$ fatty acids, were extremely stable to oxidation, and the measured values thereof were 100 hours or more to attain peroxide value of 100 milliequivalents.

Purified beef tallow, and interesterified oils and fats of Examples 8, 9 and 11, which had not been incorporated with $C_4$ and/or $C_6$ fatty acids, were used as controls and compared with the present synthetic oils and fats. The results obtained were as set forth in Table 3.

Table 3

| | AOM test results (mg equivalent/kg): | | | | | | | |
|---|---|---|---|---|---|---|---|---|
| Hour | 24 | 48 | 64 | 88 | 112 | 146 | 170 | Remarks |
| Sample* | | | | | | | | |
| Example 3 | 2.2 | 8.5 | 12.5 | — | 19.2 | 139 | 530 | |
| do. 4 | 1.8 | 7.2 | 10.5 | — | 12.1 | 110 | 470 | |
| do. 5 | 1.5 | 5.8 | 7.7 | — | 11.3 | 100 | 450 | |
| do. 6 | 1.2 | 4.9 | 6.9 | — | 10.2 | 88 | 410 | |
| do. 7 | 1.2 | 3.8 | 5.0 | — | 9.7 | 80 | 390 | |
| do. 8 | 1.8 | 6.9 | 13.1 | 117 | | | | Control |
| do. 9 | 1.7 | 7.0 | 15.8 | 103 | | | | do. |
| do. 10 | 1.9 | 5.2 | 10.0 | — | 19.8 | 218 | | |
| do. 11 | 1.4 | 6.0 | 19.0 | 160 | | | | Control |
| Beef tallow | 1.5 | 7.0 | 25.0 | 175 | | | | do. |

(Note) Beef tallow [A.V. (acid value) 0.09; I.V. 46.5; S.V. 198.1; S.P. (softening point) 35.7°C];
*Refer to Table 6.

Figure 9:
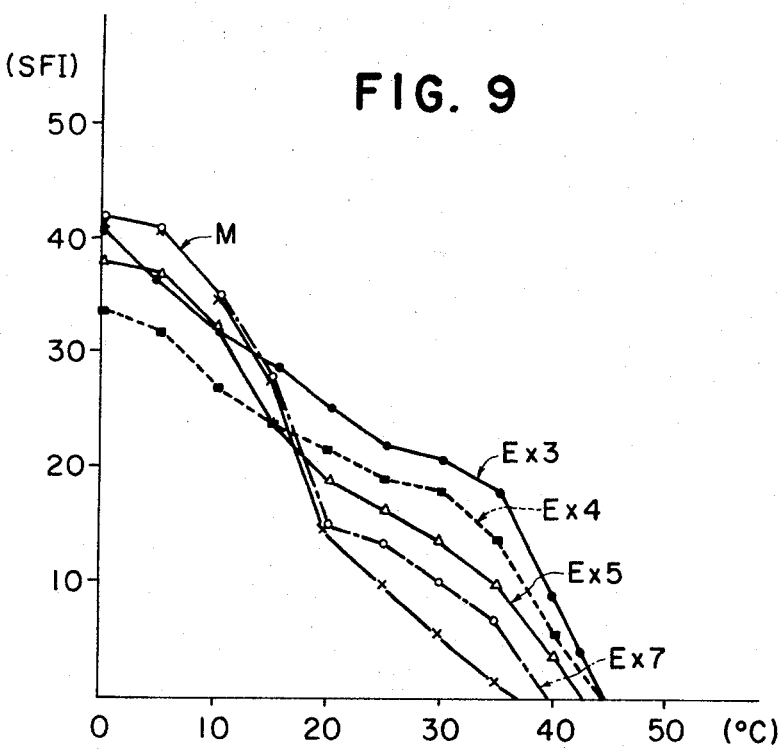

3. The synthetic oils and fats of the present invention are more excellent in melting property than natural milk fats:

The synthetic oils and fats of the present invention have such extremely convenient properties in use that they are softer at low temperatures and harder at high temperatures than natural butter. That is, they are excellent in spreadability. Such properties are ascribable to the melting properties inherent to the oils and fats used. The properties of the oils and fats are knowable according to SFI curves. That is, the oils and fats are those which are low in SFI values at low temperatures, become broader in melting point range with increasing temperature, and are strong against temperature variation. As is clear from FIG. 9, the present synthetic oils and fats are more excellent in melting properties than the milk fat represented by the line M, and have ideal properties as table butter.

(Note): Milk fat [A.V. (acid value) 1.0; I.V. 30.7; S.V. 231.2; RMV (Reichert-Meisel value) 30.1; S.P. (Softening point) 29.0°C]

4. The synthetic oils and fats of the present invention are markedly excellent in creaming property:

The same beef tallow as in the aforesaid oxidation stability test and milk fat (A.V. 1.0; I.V. 30.7; S.V. 231.2; R.M.V. 30.1; S.P. 29.0°C) were used as controls and compared in creaming property with the present synthetic oils and fats.

Each of the oils and fats was stirred by means of a Kenwood mixer (170 r.p.m.) to measure the over-run value thereof. The over-run value was measured in such a manner that the oil or fat was charged into a cup of a definite volume, measured in weight (B), stirred for 5 and 10 minutes, sampled after each of said periods of time, again charged into the same cup, measured in weight (C), and then calculated according to the following equation:

$$[(B - A) - (C - A)]/C - A) \times 100 \text{ (percent)}$$

where $A$: weight of the cup.

Table 4

| Sample | Comparison in creaming property: | | Remarks |
|---|---|---|---|
| | Over-run value (%) | | |
| | After 5 min. | After 10 min. | |
| Example | | | |
| 1 | 131.0 | 141.8 | |
| 2 | 138.4 | 152.3 | |
| 13 | 135.6 | 151.8 | |
| 14 | 140.1 | 156.8 | |
| Beef tallow | 107.8 | 121.7 | Control |
| Milk fat | 119.6 | 142.1 | do. |

Beef tallow may be greatly improved in creaming property even when only butyric acid is introduced therein, but the creaming property thereof can further be enhanced by introduction of not only butyric acid but also $C_6$, $C_8$, $C_{10}$ and $C_{12}$ fatty acids.

5. The synthetic oils and fats of the present invention can be used as novel substrates for enzyme systems to be used in the production of sweet butter flavors excellent in heat resistance:

Natural butter obtained from cow's milk may be roughly classified into sweet butter and fermented butter.

When the present synthetic oils and fats are homogenized together with skim milk and then treated with lipase, sweet butter-like flavors excellent in heat resistance can be obtained.

Characteristics and procedures for production of butter-like flavors of the prior art and those obtained from enzyme systems using the present synthetic oils and fats are set forth in Table 5.

Table 5

Kinds, production procedures and characteristics of butter-like flavors:

| Kind of flavor | Production procedure | Characteristics of product |
|---|---|---|
| Synthetic butter-like flavor. | Using diacetyl as a main component, volatile aroma components are blended together. | The product is a natural butter-like flavor but is low in heat resistance and, when used in baked goods, the flavor is volatilized. (Generally, this flavor is used for margarine.) |
| Butter-like flavor obtained by treating milk fat with enzyme. | Oil or fat in a creamy state (oil-in-water type emulstion; the same shall apply hereinafter) is treated with lipase. | Fermented butter-like flavor excellent in heat resistance. |
| Butter-like flavor obtained by blending lower fatty acids. | $C_4$, $C_6$, $C_8$ and $C_{10}$ fatty acids are blended together. | Stimulative butter-like flavor low in heat resistance. |
| Flavor obtained by treating with enzyme a natural animal or vegetable oil or fat other than milk fat. | Coconut oil or beef tallow in a creamy state is treated with lipase. | The product is a flavor entirely different from butter-like flavor and is marked in soapy flavor particularly when coconut oil was used as a main component. |
| Butter-like flavor obtained by treating with enzyme a mixture prepared by blending esters to the same fatty acid composition as in milk fat. | $C_4$, $C_6$, $C_8$, $C_{10}$ and $C_{14}$ triglycerides are blended with coconut oil and beef tallow to prepare a blend substantially identical in fatty acid composition with milk fat, and then the blend is brought to a creamy state and treated with lipase. | The product is a stimulative butter-like flavor and is low in heat resistance like in the case where lower fatty acids have been blended. |
| Butter-like flavor obtained by treating with enzyme any of the present synthetic oils and fats | $C_4$ and/or $C_6$ and, if desired, $C_8$, $C_{10}$ and $C_{12}$, and a natural animal or vegetable oil or fat are subjected to interesterification, and the reaction mixture is brought to a creamy state and then treated with lipase. | The product is a sweet butter-like and milk cream-like flavor excellent in heat resistance. |

The present invention is illustrated in detail below with reference to examples, in which all parts and percentages are by weight.

EXAMPLES 1 to 27

The kinds of starting blends and the properties of the resulting synthetic oils and fats were as set forth in Table 6.

In each of Examples 1 to 27, the starting oil or fat was mixed with esters, and the resulting mixture was heated to 70°C. Subsequently, the mixture was tightly closed in a reactor and then completely dehydrated at 120°C under a reduced pressure of 20 mmHg. After cooling the completely dehydrated mixture to 70°C, the pressure was increased to normal pressure. 100 Parts of this mixture was incorporated with 0.5 part of sodium methylate, and subjected to interesterification for 1 hour, after replacing the air inside the reactor with an inert gas (e.g., $N_2$ gas). Thereafter, the reaction mixture was incorporated with 1 part (per part of oil or fat) of water, sufficiently stirred, further incorporated with 1 part (per part of oil or fat) of diatomaceous earth as a filtration aid, and then subjected to filtration to obtain an interesterified oil or fat free from the catalyst. The thus obtained synthetic oil or fat was decolorized at 110°C for 15 minutes by addition of 1 part of a mixed decolorizing agent composed of active carbon and active clay. After removing the decolorizing agent by filtration, the mixture was subjected to deodorization (reduced pressure steam distillation) at 240°C for 1.5 hours under a reduced pressure of below 5 mmHg. to obtain a purified synthetic oil or fat.

The values of $C_4$-$C_{12}$ fatty acid compositions in Table 6, and those of $C_{20}$-$C_{56}$ glyceride compositions in Table 7 are values obtained by analyzing the thus obtained purified synthetic oils and fats according to gas chromatography. The values of $C_{14}$ and more carbon number fatty acid compositions were omitted.

As is clear also from the AOM test results set forth in the aforesaid Table 3, the synthetic oils and fats of Examples 8, 9 and 11, which had not been incorporated with $C_4$ and/or $C_6$ fatty acids, were lower in oxidation stability, like in the case of beef tallow, than the synthetic oils and fats of the present invention. In addition, the excellent properties of the synthetic oils and fats were recognized also in the aforesaid FIG. 9 and Table 4.

The upper limit of the amount of $C_4$ and/or $C_6$ fatty acids was decided according to Examples 18, 19, 21 and 22. That is, in case the amount of $C_4$ or $C_6$ fatty acid exceeded 25 percent, like in Examples 21 and 22, bitterness was left in the resulting synthetic oils and fats, but no bitterness was left in the products of Examples 18 and 19, so that the upper limit of the amount of $C_4$ and/or $C_6$ fatty acids was decided to be 25 percent. The lower limit of the amount of $C_4$ and/or $C_6$ fatty acids was decided according to Example 28 set forth below.

EXAMPLE 28

A mixture comprising 45 parts of each of the synthetic oils and fats of Examples 1, 14, 20, 23, 24 and 25, 55 parts of skim milk and 0.5 part of a sorbitan fatty acid ester (Span 60, produced by Kao Atlas CO.) was propeller-agitated at 70°C for about 15 minutes, and then homogenized by passing the mixture through a homogenizer under a pressure of 40 kg/cm². The resulting creamy substance was heated to 40°C, and 0.15 part of lipase (isolated from Pseudomonas ovalis) having a titre of 200,000 units/g was uniformly mixed first with a small amount of the creamy substance and then with the whole amount thereof. In the above manner, the creamy substance was treated with the enzyme at 37°C for 24 hours. Thereafter, the creamy substance thus treated was sterilized at 70°C for 15 minutes and then cooled to 10°C.

Among the products obtained according to the above-mentioned procedures, there were those which had functions as cream-like flavors or sweet butter-like flavor and those which had no such functions.

A mixture of 1 part of each of the thus obtained products and 99 parts of beef tallow was heated to 60°C, and the tendency of the resulting flavor was investigated according to organoleptic test. The results obtained were as set forth in Table 8.

Table 6

| Example | C₄ Triglyceride | C₆ Triglyceride | C₈ Triglyceride | C₁₀ Triglyceride | C₁₂ Triglyceride | C₁₄ Triglyceride | Coconut oil | Hardened palm-kernal oil | Palm oil fractionation crystal moiety | Beef tallow fractionation liquid moiety | Beef tallow | Beef tallow fractionation crystal moiety |
|---|---|---|---|---|---|---|---|---|---|---|---|---|
| 1 | 7 | | | | | | | | | | 93 | |
| 2 | 7 | | | | | 10 | | | | | 83 | |
| 3 | 6 | | | | 10 | | | | | 30 | 54 | |
| 4 | 6 | 4 | | | 10 | | | | | 30 | 50 | |
| 5 | 6 | 4 | 4 | | 10 | | | | | 30 | 46 | |
| 6 | 6 | 4 | 2 | 4 | 10 | | | | | 30 | 44 | |
| 7 | 6 | 4 | 2 | 4 | 10 | 6 | | | | 30 | 38 | |
| 8 | | | | 4 | 10 | 5 | | | | 30 | 51 | |
| 9 | | 4 | 4 | 4 | 10 | 5 | | | | 30 | 47 | |
| 10 | | 4 | 2 | 4 | 10 | 5 | | | | 30 | 45 | |
| 11 | | | | | 12 | | | | | 35 | 53 | |
| 12 | 7 | | | | | | | 25 | | | 28 | 40 |
| 13 | 5.1 | 2.0 | 0.8 | 2.1 | 6 | 5 | | | 10 | 40 | 29 | |

| Example | C Butyl ester | C* E.G.E. | After interesterification and purification of oils and fats (Fatty acid composition: C–C ) | | | | | I.V. | S.V. | R.M.V. | S.P. (°C) | Remarks |
|---|---|---|---|---|---|---|---|---|---|---|---|---|
| | | | C | C | C | C | C | | | | | |
| 1 | 4.4 | — | | trace | trace | | 0.3 | 43.4 | 220.7 | 30.5 | 37.8 | |
| 2 | 4.3 | 0.1 | 0.4 | 0.7 | | 4.7 | | 39.4 | 226.2 | 30.0 | 36.7 | |
| 3 | 4.1 | — | — | — | | 0.1 | | 30.5 | 221.3 | 26.1 | 40.1 | |
| 4 | 4.3 | 3.5 | 0.1 | 0.2 | | 0.4 | | 28.2 | 230.2 | 40.0 | 37.9 | |
| 5 | 4.1 | 3.5 | 3.3 | 0.5 | | 0.4 | | 26.2 | 235.5 | 40.4 | 37.0 | |
| 6 | 4.1 | 3.3 | 2.3 | 3.0 | | 0.5 | | 25.6 | 235.9 | 40.5 | 34.2 | |
| 7 | 4.4 | 3.5 | 2.6 | 3.8 | | 3.7 | | 23.5 | 239.9 | 40.3 | 31.8 | |
| 8 | — | — | 0.5 | 3.9 | | 2.6 | | 27.9 | 209.3 | 1.3 | 41.3 | Control |
| 9 | — | — | 4.6 | 4.4 | | 2.9 | | 25.8 | 215.8 | 4.6 | 39.0 | do. |
| 10 | — | 4.2 | 2.8 | 4.0 | | 2.7 | | 25.4 | 220.9 | 15.2 | 38.4 | |
| 11 | — | — | — | — | | 0.2 | | 29.6 | 201.4 | — | — | Control |
| 12 | 4.4 | trace | 0.4 | 0.9 | | 12.0 | | 26.4 | 232.6 | 31.9 | 36.0 | |
| 13 | 3.6 | 1.8 | 1.3 | 2.6 | | 2.9 | | 36.0 | 225.0 | 28.4 | 32.4 | |

| Example | C₄ Triglyceride | C₆ Triglyceride | C₈ Triglyceride | C₁₀ Triglyceride | C₁₂ Triglyceride | C₁₄ Triglcyeride | Coconut oil | Hardened palm-kernal oil | Palm oil fractionation crystal moiety | Beef tallow fractionation liquid moiety | Beef tallow | Beef tallow fractionation crystal moiety |
|---|---|---|---|---|---|---|---|---|---|---|---|---|
| 14 | 5.1 | 2.0 | 0.8 | 2.1 | 6 | 5 | | | | 40 | 39 | |
| 15 | | 7 | | | | | | | | | 93 | |
| 16 | | | 7 | | | | | | | | 93 | |
| 17 | | | | 7 | | | | | | | 93 | |
| 18 | 30 | | | | | | | | | | 70 | |
| 19 | | 25 | | | | | | | | | 75 | |
| 20 | 2.5 | | 7 | 7 | | | | | | | 83.5 | |
| 21 | 50 | | | | | | | | | | 50 | |
| 22 | | 30 | | | | | | | | | 70 | |
| 23 | | 2.0 | 7 | 7 | | | | | | | 84 | |
| 24 | 4.5 | 1.5 | 2 | 2 | 4 | | | | | | 86 | |
| 25 | 4.5 | 1.5 | 2 | 2 | 12 | | | | | | 78 | |
| 26 | | | | | | | 10 | | | | 80 | |
| 27 | | | | | | | 10 | | | | 83 | |

| Example | C₄ Butyl ester | C₄* E.G.E | After interesterification and purification of oils and fats (Fatty acid composition: C₄-C₁₂) | | | | | I.V. | S.V. | R.M.V. | S.P. (°C) | Remarks |
|---|---|---|---|---|---|---|---|---|---|---|---|---|
| | | | C₄ | C₆ | C₈ | C₁₀ | C₁₂ | | | | | |
| 14 | | | 3.4 | 1.6 | 1.3 | 2.5 | 2.6 | 39.8 | 223.6 | 28.6 | 30.4 | |
| 15 | | | 0.3 | 7.3 | trace | trace | 0.2 | 42.9 | 212.3 | 23.8 | 35.0 | |
| 16 | | | trace | 0.1 | 7.2 | 0.1 | 0.2 | 43.5 | 207.3 | 6.3 | 35.7 | Control |
| 17 | | | — | trace | 0.1 | 7.0 | 0.2 | 43.6 | 203.1 | 1.0 | 36.8 | do. |
| 18 | | | 24.8 | — | 0.1 | 0.1 | 1.8 | — | — | — | — | |
| 19 | | | 1.0 | 23.7 | 0.1 | 0.1 | 1.5 | — | — | — | — | |
| 20 | | | 1.0 | 0.1 | 7.2 | 7.2 | 0.4 | — | — | — | — | |
| 21 | | | 27.8 | — | 0.2 | 0.2 | 2.0 | — | — | — | — | Control |
| 22 | | | 1.2 | 27.9 | 0.1 | 0.2 | 1.7 | — | — | — | — | do. |
| 23 | | | — | 1.0 | 7.1 | 7.3 | 0.4 | — | — | — | — | |
| 24 | | | 4.0 | 1.4 | 2.0 | 2.4 | 4.9 | 40.4 | 221.9 | 26.6 | 33.8 | |
| 25 | | | 4.2 | 1.8 | 2.2 | 2.5 | 11.6 | 36.8 | 226.8 | 24.8 | 32.5 | |
| 26 | 10 | | 5.0 | 0.1 | 0.5 | 0.9 | 4.4 | — | — | — | — | |
| 27 | | 7 | 4.0 | 0.1 | 0.5 | 0.8 | 4.5 | — | — | — | — | |

* Ethylene glycol diester

Table 7

Triglyceride compositions after interesterification, and purification of oils and fats:

| Example | Carbon Number 56 | 54 | 52 | 50 | 48 | 46 | 44 | 42 | 40 | 38 | 36 | 34 | 32 |
|---|---|---|---|---|---|---|---|---|---|---|---|---|---|
| 1 | trace | 11.3 | 17.8 | 13.1 | 5.0 | 1.0 | 0.2 | trace | 18.6 | 17.2 | 6.8 | 1.6 | 0.3 |
| 2 |  | 11.4 | 15.4 | 11.9 | 10.2 | 6.9 | 4.5 | 3.5 | 9.9 | 10.2 | 5.3 | 4.0 | 2.0 |
| 3 |  | 3.3 | 16.7 | 19.8 | 15.4 | 5.2 | 2.9 | 0.9 | 4.9 | 10.5 | 9.8 | 5.0 | 1.5 |
| 4 |  | 3.5 | 12.7 | 15.6 | 12.1 | 6.8 | 1.9 | 4.1 | 8.4 | 11.7 | 9.6 | 4.5 | 1.3 |
| 5 |  | 2.8 | 9.3 | 12.6 | 10.4 | 5.6 | 3.6 | 5.8 | 9.2 | 11.9 | 9.8 | 5.1 | 2.4 |
| 6 |  | 2.1 | 7.9 | 11.0 | 10.4 | 6.5 | 4.3 | 5.5 | 9.2 | 11.4 | 9.6 | 6.0 | 3.0 |
| 7 |  | 1.1 | 6.4 | 1.1 | 10.5 | 8.2 | 6.6 | 6.7 | 9.1 | 11.9 | 10.6 | 7.2 | 4.8 |
| 8 |  | 5.1 | 16.5 | 24.7 | 18.8 | 12.2 | 9.5 | 4.2 | 2.6 | 1.5 | 1.7 | 1.5 | 0.7 |
| 9 |  | 3.7 | 12.7 | 19.8 | 15.3 | 10.3 | 11.0 | 7.5 | 6.7 | 3.9 | 3.1 | 2.7 | 1.4 |
| 10 |  | 3.0 | 10.9 | 17.5 | 14.4 | 10.0 | 9.1 | 6.5 | 8.4 | 6.7 | 4.4 | 3.1 | 2.2 |
| 11 |  | 20.3 | 25.7 | 15.6 | 7.1 | 10.5 | 8.7 | 4.2 | 1.6 | 3.5 | 2.1 | 0.4 | — |
| 12 |  | 7.5 | 10.9 | 9.5 | 11.2 | 8.8 | 6.4 | 5.0 | 9.2 | 8.9 | 5.6 | 5.9 | 3.4 |
| 13 |  | 8.4 | 13.4 | 13.6 | 9.4 | 6.3 | 4.8 | 4.8 | 9.2 | 10.5 | 6.8 | 3.5 | 2.1 |
| 14 |  | 11.2 | 14.3 | 13.4 | 9.4 | 6.9 | 5.2 | 4.5 | 8.7 | 8.5 | 6.0 | 3.5 | 2.1 |
| 15 |  | 17.1 | 22.6 | 15.4 | 6.3 | 2.2 | 1.5 | 11.4 | 10.4 | 5.7 | 2.5 | 0.6 | 0.2 |
| 16 |  | 17.6 | 23.9 | 14.8 | 6.9 | 3.5 | 9.9 | 9.3 | 4.8 | 3.2 | 2.2 | 2.0 | 0.8 |
| 17 |  | 17.5 | 24.6 | 15.8 | 7.2 | 10.7 | 9.7 | 4.5 | 1.8 | 4.0 | 2.7 | 0.8 | — |
| 18 |  | 5.1 | 7.0 | 4.6 | 2.1 | 0.9 | trace | trace | 16.1 | 16.2 | 6.6 | 1.8 | * |
| 19 |  | 6.1 | 8.0 | 5.4 | 2.3 | 1.3 | 18.2 | 15.7 | 7.3 | 2.8 | 1.6 | 1.9 | 14.9 |
| 20 |  | 11.6 | 15.0 | 9.8 | 4.2 | 8.3 | 11.7 | 9.2 | 7.7 | 6.8 | 5.2 | 2.9 | 2.3 |
| 21 |  | 1.7 | 2.1 | 1.6 | 0.8 | 0.6 | 0.5 | — | 12.5 | 11.8 | 4.6 | 1.3 | * |
| 22 |  | 4.7 | 6.9 | 4.1 | 1.8 | 0.5 | 19.1 | 16.6 | 7.9 | 2.6 | 0.7 | 1.8 | 19.3 |
| 23 |  | 11.6 | 15.7 | 10.0 | 4.8 | 8.1 | 11.6 | 10.9 | 6.4 | 4.8 | 4.9 | 4.6 | 2.6 |
| 24 |  | 12.6 | 17.6 | 11.5 | 7.6 | 6.0 | 5.2 | 5.3 | 10.7 | 9.3 | 4.3 | 2.4 | 1.6 |
| 25 |  | 9.9 | 13.2 | 8.8 | 9.8 | 8.6 | 6.1 | 6.1 | 10.2 | 8.5 | 4.8 | 4.3 | 3.0 |
| 26 |  | 12.1 | 15.7 | 11.3 | 8.6 | 6.1 | 4.0 | 2.9 | 10.4 | 10.9 | 5.7 | 3.7 | 1.8 |
| 27 |  | 12.7 | 15.7 | 12.1 | 9.6 | 6.5 | 4.1 | 3.1 | 10.3 | 10.4 | 5.0 | 3.3 | 1.6 |
|  |  | 3.8 | 6.1 | 6.8 | 12.7 | 12.4 | 10.9 | 11.6 | 7.5 | 6.7 | 4.9 | 2.8 | 2.3 |
|  | 0.2 | 4.0 | 9.9 | 10.8 | 8.0 | 6.4 | 5.7 | 6.3 | 10.3 | 13.9 | 12.3 | 6.4 | 2.9 |

*Total of 28, 30 and 32 carbons

Table 7—Continued

| Example | Carbon Number 30 | 28 | 26 | 24 | 22 | 20 | Total | Remarks type |
|---|---|---|---|---|---|---|---|---|
| 1 | trace | — | 3.9 | 2.2 | 0.4 | — |  | A |
| 2 | 1.1 | 0.6 | 1.7 | 1.1 | 0.3 | trace | 100.0 | A |
| 3 | 0.3 | — | 1.2 | 1.7 | 0.8 | 0.1 | 100.0 | A |
| 4 | 0.8 | 1.9 | 2.5 | 1.9 | 0.6 | 0.1 | 100.0 | A |
| 5 | 2.3 | 2.8 | 3.0 | 2.2 | 1.2 | 0.2 | 100.0 | A |
| 6 | 2.4 | 2.9 | 3.4 | 2.9 | 1.3 | 0.2 | 100.0 | B |
| 7 | 3.4 | 3.7 | 3.7 | 2.9 | 1.5 | 0.6 | 100.0 | B |
| 8 | 0.6 | 0.3 | 0.1 | — | — | — | 100.0 | Control |
| 9 | 0.7 | 0.6 | 0.4 | 0.2 | — | — | 100.0 | do. |
| 10 | 1.5 | 1.0 | 0.7 | 0.4 | 0.2 | — | 100.0 | A |
| 11 | 0.3 | — | — | — | — | — | — | Control |
| 12 | 1.7 | 0.9 | 2.0 | 1.8 | 0.6 | 0.7 | 100.0 | A |
| 13 | 1.4 | 1.4 | 2.2 | 1.6 | 0.6 | — | 100.0 | A |
| 14 | 1.3 | 1.1 | 1.8 | 1.3 | 0.8 | — | 100.0 | A |
| 15 | 1.9 | 0.9 | 0.8 | 0.3 | 0.2 | — |  | A |
| 16 | 0.2 | 0.6 | 0.3 | — | — | — |  | Control |
| 17 | 0.5 | 0.2 | — | — | — | — |  | do. |
| 18 | 1.0* | * | 20.6 | 14.1 | 3.6 | 0.4 | 100.1 | B |
| 19 | 8.2 | 3.7 | 1.2 | 0.7 | 0.7 | — |  | A |
| 20 | 2.6 | 1.4 | 0.6 | 0.4 | 0.2 | 0.1 |  | A |
| 21 | 2.1* | * | 36.0 | 19.7 | 4.0 | 0.6 | 99.9 | Control |
| 22 | 9.2 | 3.3 | 1.0 | 0.5 | — | — |  | do. |
| 23 | 1.6 | 1.1 | 0.7 | 0.3 | 0.2 | 0.1 |  | A |
| 24 | 1.4 | 1.2 | 1.7 | 1.2 | 0.4 | — |  | A |
| 25 | 1.7 | 1.6 | 1.7 | 1.1 | 0.4 | 0.2 |  | A |
| 26 | 0.9 | 0.5 | 2.8 | 1.8 | 0.5 | 0.3 |  | A |
| 27 | 0.8 | 0.4 | 1.8 | 1.4 | 0.7 | 0.5 |  | A |
|  | 10.1 | 0.7 | 0.7 | — | — | — |  | Control (coconut (50%) and lard (50%) are interesterificated and purified) |
|  | 1.4 | 0.8 | 0.3 | trace | 0.1 | (25) 0.4 | 100.1 | Milk fat |

* Total of 28, 30 and 32 carbons

Table 8

Tendency of flavor of product obtained:

| Starting oil or fat | | Tendency of flavor |
|---|---|---|
| Example | 1 | Desirable milk cream flavor |
| do. | 14 | Desirable sweet butter-like flavor |
| do. | 20 | Faint milk flavor |
| do. | 23 | do. |
| do. | 24 | Desirable sweet butter-like flavor |
| do. | 25 | Undesirable flavor with a soapy flavor |

In view of Examples of 20 and 23, the amount of $C_4$ and/or $C_6$ fatty acids, when used as substrates for flavor, should be at least 1.0 percent by weight. Further, it has been found from Example 25 that the amount of $C_{12}$ fatty acid, when used as a substrate for flavor, should be less than 10 percent by weight. However, when $C_{12}$ fatty acid is used for margarine or the like product, the amount of said acid is not required to be limited to less than 10 percent. This has been substantiated from the fact that when used for margarine, the synthetic oil of Example 12 sufficiently displayed its function.

In the next place, flavors obtained by use of the synthetic oils of Examples 1 and 14 were subjected to heat resistance test. As controls, there were used butter-like flavors obtained according to the conventional or the like process. The heat resistance test was carried out in the following manner:

1 Part by weight of each flavor was incorporated into 99 parts by weight of purified beef tallow, and the resulting mixture was heated at 150°C for 40 minutes and then cooled to 60°C. In this case, the extent of degradation in heat resistance of each flavor after the heating was evaluated, assuming as 10 the heat resistance of the flavor before heating. Average values of evaluations given by 10 selected panel members were as set forth in Table 9.

Table 9

Heat resistance test

| Kind of flavor | Average value |
|---|---|
| Flavor obtained by treating with enzyme the synthetic fat of Example 1. | 8.1 |

Table 9—Continued

Heat resistance test

| Kind of flavor | Average value |
|---|---|
| Flavor obtained by treating with enzyme the synthetic fat of Example 14. | 8.5 |
| Commercially available synthetic flavor composed mainly of diacetyl. | 4.8 |
| Flavor obtained by treating milk fat with enzyme. | 8.2 |
| Flavor obtained by treating with enzyme the blend of Example 14 which had not been subjected to interesterification | 5.1 |

From examples 26 and 27 in Tables 6 and 7, it will be seen that there is no difference between when mono- or di-ester of butyric acid is used as a reagent in the interesterification and when triglyceride of butyric acid is used, so far as the composition of the final product is concerned. In the former case, the mono- or di-ester is vaporized off in the course of purification to leave triglyceride moieties.

We claim:

1. An oil or fat composition exhibiting a buttery flavor consisting essentially of a mixture of glycerides having carbon numbers from 22 to 54, the total content of $C_{36}$ and $C_{38}$ glycerides being up to 25 wt percent, and the contents of $C_{22}$, $C_{24}$ and $C_{26}$ glycerides being from 0.2 to 3.8 wt percent, from 0.2 to 15.0 wt percent and from 0.4 to 25.0 wt percent, respectively, based on the weight of said composition and said glycerides having a $C_4$ to $C_{22}$ fatty acid content, the content of at least one of the $C_4$ and $C_6$ fatty acids being from 1 to 25 wt percent, the content of $C_8$ fatty acid being 0.5 to 10 wt percent, the content of $C_{10}$ fatty acids being 0.5 to 10 wt percent and the content of $C_{12}$ fatty acid being from 0.5 to 10 wt percent based on a total weight of the fatty acid content in the composition.

2. A composition according to claim 1 which shows 100 hours or more of A.O.M. stability value to attain peroxide value of 100 milliequivalent.

3. The composition of claim 1, wherein the contents of $C_{22}$, $C_{24}$ and $C_{26}$ glycerides are 0.2 to 1.2 wt percent, 0.2 to 2.5 wt percent, and 0.4 to 4.0 wt percent, respectively.

* * * * *

UNITED STATES PATENT OFFICE
CERTIFICATE OF CORRECTION

Patent No. 3,870,733             Dated March 11, 1975

Inventor(s) Hayato KUBOTA, Sadao NAKAYAMA and Teizaburo TATEISHI

It is certified that error appears in the above-identified patent and that said Letters Patent are hereby corrected as shown below:

On the Title Page, lefthand column:

[54] "MIXTURES OF GLYCERIDES HAVING CYTO-C22 FATTY ACID CONTENT" should read

-- MIXTURES OF GLYCERIDES HAVING $C_4$ TO $C_{22}$ FATTY ACID CONTENT --

[63] - In line 4 thereof, change "53,146" to --52,146--

Following [63] please insert:

--[30]     Foreign Application Priority Data
       July 31, 1969 Japan............60659/69--

Signed and Sealed this nineteenth Day of August 1975

[SEAL]

Attest:

RUTH C. MASON  
*Attesting Officer*

C. MARSHALL DANN  
*Commissioner of Patents and Trademarks*